United States Patent
Merino Vazquez et al.

(10) Patent No.: US 12,301,643 B2
(45) Date of Patent: May 13, 2025

(54) MEDIA GATEWAY DYNAMIC DISCOVERY IN IMS

(71) Applicant: Telefonaktiebolaget LM Ericsson (publ), Stockholm (SE)

(72) Inventors: Emiliano Merino Vazquez, Madrid (ES); Susana Fernandez Alonso, Madrid (ES); Jesús Ángel De Gregorio Rodriguez, Madrid (ES); Xinyu Zhang, Shanghai (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 52 days.

(21) Appl. No.: 18/553,796

(22) PCT Filed: Apr. 5, 2022

(86) PCT No.: PCT/IB2022/053181
§ 371 (c)(1),
(2) Date: Oct. 3, 2023

(87) PCT Pub. No.: WO2022/214971
PCT Pub. Date: Oct. 13, 2022

(65) Prior Publication Data
US 2024/0223632 A1  Jul. 4, 2024

Related U.S. Application Data

(60) Provisional application No. 63/171,287, filed on Apr. 6, 2021.

(51) Int. Cl.
*H04L 65/60* (2022.01)
*H04L 65/1016* (2022.01)
*H04L 65/1023* (2022.01)

(52) U.S. Cl.
CPC .......... *H04L 65/60* (2013.01); *H04L 65/1016* (2013.01); *H04L 65/1023* (2013.01)

(58) Field of Classification Search
CPC . H04L 65/60; H04L 65/1016; H04L 65/1023; H04L 65/1069; H04L 67/51
See application file for complete search history.

(56) References Cited

U.S. PATENT DOCUMENTS

| | | | |
|---|---|---|---|
| 2019/0059024 A1* | 2/2019 | Mufti | H04L 65/1069 |
| 2020/0112907 A1* | 4/2020 | Dao | H04M 15/8016 |
| 2022/0191747 A1* | 6/2022 | Ignjatovic | H04L 65/1016 |

OTHER PUBLICATIONS

International Search Report and Written Opinion dated Jun. 15, 2022 issued in PCT Application No. PCT/IB2022/053181 filed Apr. 5, 2022, consisting of 19 pages.
(Continued)

*Primary Examiner* — Chris Parry
*Assistant Examiner* — Steven C Nguyen
(74) *Attorney, Agent, or Firm* — Weisberg I.P. Law, P.A.

(57) ABSTRACT

A method in a network node is described. The method includes receiving a discovery request from a first network function (NF) node to discover at least one media NF type node. The discovery request indicates a media NF type of the at least one media NF type node. The media NF type is one of an access media gateway (A-MGW), an Internet Protocol (IP) multi-media gateway (IM-MGW), and a media resource function (MRF). The method further includes discovering the at least one media NF type node and transmitting a discovery response to the discovery request. The discovery response indicates the discovered at least one media NF type node and at least one corresponding NF profile. The at least one corresponding NF profile comprises at least one of one or more media types, one or more supported codecs, and transcoding support information.

28 Claims, 10 Drawing Sheets

(56) References Cited

OTHER PUBLICATIONS

3GPP TR 23.700-12 V0.3.0 (Mar. 2021) 3rd Generation Partnership Project; Technical Specification Group Core Network and Terminals; Study on enhanced IP Multimedia Subsystem (IMS) to 5GC integration Phase 2; CT WG4 aspects (Release 17), consisting of 13 pages.
3GPP TR 23.700-12 V17.0.0 (Dec. 2021) 3rd Generation Partnership Project; Technical Specification Group Core Network and Terminals; Study on enhanced IP Multimedia Subsystem (IMS) to 5GC integration Phase 2; CT WG4 aspects (Release 17), consisting of 22 pages.
3GPP TS 23.501 V17.0.0 (Mar. 2021) 3rd Generation Partnership Project; Technical Specification Group Services and System Aspects; System architecture for the 5G System (5GS); Stage 2 (Release 17), consisting of 489 pages.
3GPP TS 23.502 V16.7.1 (Jan. 2021) 3rd Generation Partnership Project; Technical Specification Group Services and System Aspects; Procedures for the 5G System (5GS); Stage 2 (Release 16), consisting of 603 pages.
3GPP TS 29.510 V17.0.0 (Dec. 2020) 3rd Generation Partnership Project; Technical Specification Group Core Network and Terminals; 5G System; Network Function Repository Services; Stage 3 (Release 17), consisting of 229 pages.
3GPP TR 23.700-12 V0.0.0 (Sep. 2020) 3rd Generation Partnership Project; Technical Specification Group Core Network and Terminals; Study on enhanced IP Multimedia Subsystem (IMS) to 5GC integration Phase 2; CT WG4 aspects (Release 17), consisting of 7 pages.

\* cited by examiner

MEDIA GATEWAY DYNAMIC DISCOVERY IN IMS

CROSS-REFERENCE TO RELATED APPLICATIONS

This application is a Submission Under 35 U.S.C. § 371 for U.S. National Stage Patent Application of International Application No.: PCT/IB2022/053181, filed Apr. 5, 2022 entitled "MEDIA GATEWAY DYNAMIC DISCOVERY IN IMS," which claims priority to U.S. Provisional Application No.: 63/171,287, filed Apr. 6, 2021, entitled "MEDIA GATEWAY DYNAMIC DISCOVERY IN IMS" the entireties of both of which are incorporated herein by reference.

TECHNICAL FIELD

The present disclosure relates to wireless communications and in particular, media gateway dynamic discovery in IMS.

BACKGROUND

An example of Internet Protocol (IP) Multimedia Subsystem (IMS) architecture is defined in $3^{rd}$ Generation Partnership Project (3GPP) Technical Specification (TS) 23.228. The IMS architecture can interwork with evolved packet core (EPC) and 3GPP $5^{th}$ Generation (5G, also called New Radio or NR) Core (5GC) when it comes to Multimedia Telephony (e.g., Voice over Long Term Evolution LTE (VOLTE)). In Multimedia Telephony, there are different user plane (UP) functions in charge of managing the voice/video traffic/IP packets (e.g., real-time transport protocol (RTP) packets). These functions are placed in different hops in the network and are selected by different IMS functions, e.g., proxy call session control function (P-CSCF) selects an access media gateway (A-MGW/ATGW) so that the voice media sent by the user's user equipment (UE, also called wireless device or WD) traverse this gateway. A media gateway control function (MGCF) also selects a media gateway (MGW, also called IP multimedia gateway or IM-MGW) when interworking with the circuit switched (CS) domain. Additionally, when voice media or announcements are to be sent from the network, an IMS application server (IMS-AS, acting as a media resource function controller (MRFC) can select an MRFP (media resource function processor) which, similarly to MGWs, can manage the voice packets in the uplink and downlink direction (i.e., from/to the UE).

FIGS. 1A and 1B show how an example MGW selection may be performed and in which IMS network functions (NFs) the example MGW selection may be performed. With such an arrangement, in order to select a proper MGW in IMS, the configuration of the different parameters (H.248 IP addresses, codecs supported, transcoding support, dual-tone multi-frequency (DTMF)/telephone-events supported, etc.) must be performed in all the IMS nodes deployed, which may include media gateway controllers (e.g., P-CSCF, access transfer control function (ATCF), Multimedia Telephony application server (MMTEL-AS), MGCF. Each time a new software upgrade is performed in an MGW (e.g., to support a new voice or video codec), all the affected IMS nodes are then re-configured to have the most up to date information. During scale out procedures, if a new MGW is instantiated in the network, again, all the IMS nodes are re-configured to have the whole set of information for the new MGW. This consumes network resources.

In addition, it may be desirable to select an MGW near the geographical area where the UE is camping on. Hence, the existing configuration may allow additional options to select the closest MGW. However, this further complicates the operations and maintenance (O&M) of the whole network because the cell identifiers (cell IDs) or geographical area information is very large (i.e., exceeds a predetermined area threshold), and may be consistent across all the IMS NFs the whole time.

SUMMARY

Some embodiments advantageously provide methods and apparatuses for media gateway dynamic discovery in IMS.

In one embodiment, a network node is configured to receive a discovery request from a first network function (NF) node, the discovery request indicating at least one media-related information associated with a user equipment (UE); discover at least one second NF node based at least in part on the media-related information; and send a discovery response to the discovery request, the discovery response indicating the discovered at least one second NF node.

In another embodiment, a network node is configured to send a discovery request, the discovery request indicating at least one media-related information associated with a user equipment (UE); and receive a discovery response to the discovery request, the discovery response indicating at least one second NF node, the at least one second NF node being discovered based at least in part on the media-related information.

According to one aspect, a method in a network node is described. The method includes receiving a discovery request from a first network function (NF) node to discover at least one media NF type node, the discovery request indicating a media NF type of at least one media NF type node. The media NF type is one of an access media gateway (A-MGW), an Internet Protocol (IP) multi-media gateway (IM-MGW), and a media resource function (MRF). The method further includes discovering the at least one media NF type node; and transmitting a discovery response to the discovery request. The discovery response indicates the discovered at least one media NF type node and at least one corresponding NF profile. The at least one corresponding NF profile comprise at least one of one or more media types, one or more supported codecs, and transcoding support information.

In some embodiments, the first NF node is an Internet Protocol (IP) multimedia subsystem (IMS) node.

In some other embodiments, the IMS node is one of a proxy call session control function (P-CSCF) node, a media gateway control function (MGCF) node and an IMS application server (IMS-AS) node.

In one embodiment, the discovery request further indicates at least one of the one or more media types, the one or more supported codecs, and the transcoding support information required to be supported by the at least one media NF type node; and discovering the at least one media NF type node further comprises discovering the at least one media NF type node supporting the at least one of one or more media types, one or more supported codecs, and transcoding support information indicated in the discovery request.

In another embodiment, the discovery request further indicates location information for the UE, the location information for the UE including at least one of a cell identifier associated with UE and network provided location information, NPLI, for the UE.

In some embodiments, the at least one corresponding NF profile further comprises one or more H.248 capabilities.

In one embodiment, discovering the at least one media NF type node further comprises discovering the at least one media NF type node having profile information corresponding to at least one parameter indicated in the discovery request.

In another embodiment, at least one of: the network node comprises a network repository function, NRF, node; and the network node is provisioned with at least one NF profile corresponding to the at least one media NF type node.

In some embodiments, the method further includes receiving a subscription request to be notified about one of an added media NF type node and an NF profile update of an existing media NF type node; and transmitting a notification upon detection of the one of the added media NF type node and the NF profile update.

According to another aspect, a network node is described. The network node comprises processing circuitry configured to cause the network node to receive a discovery request from a first network function (NF) node to discover at least one media NF type node. The discovery request indicates a media NF type of at least one media NF type node. The media NF type is one of an access media gateway (A-MGW), an Internet Protocol (IP) multi-media gateway (IM-MGW), and a media resource function (MRF). The processing circuitry is further configured to discover the at least one media NF type node and cause the network node to transmit a discovery response to the discovery request. The discovery response indicates the discovered at least one media NF type node and at least one corresponding NF profile. The at least one corresponding NF profile comprises at least one of one or more media types, one or more supported codecs, and transcoding support information.

In some embodiments, the first NF node is an Internet Protocol (IP) multimedia subsystem (IMS) node.

In some other embodiments, the IMS node is one of a proxy call session control function (P-CSCF) node, a media gateway control function (MGCF) node and an IMS application server (IMS-AS) node.

In one embodiment, wherein the discovery request further indicates at least one of the one or more media types, the one or more supported codecs, and the transcoding support information required to be supported by the at least one media NF type node, and discovering the at least one media NF type node further comprises discovering the at least one media NF type node supporting the at least one of one or more media types, one or more supported codecs, and transcoding support information indicated in the discovery request.

In another embodiment, the discovery request further indicates location information for the UE, the location information for the UE including at least one of a cell identifier associated with UE and network provided location information, NPLI, for the UE.

In some embodiments, the at least one corresponding NF profile further comprises one or more H.248 capabilities.

In one embodiment, the processing circuitry configured to discover the at least one media NF type node is further configured to discover the at least one media NF type node having profile information corresponding to at least one parameter indicated in the discovery request.

In another embodiment, at least one of: the network node comprises a network repository function, NRF, node; and the network node is provisioned with at least one NF profile corresponding to the at least one media NF type node.

In some embodiments, the processing circuitry is further configured to cause the network node to receive a subscription request to be notified about one of an added media NF type node and an NF profile update of an existing media NF type node; and transmit a notification upon detection of the one of the added media NF type node and the NF profile update.

According to another aspect, a method in a network node is described. The network node comprises a first network function (NF) node. The method comprises transmitting a discovery request to trigger a discovery of at least one media NF type node. The discovery request indicates a media NF type of the at least one media NF type node. The media NF type is one of an access media gateway (A-MGW), an Internet Protocol (IP) multi-media gateway (IM-MGW), and a media resource function (MRF). The method further includes receiving a discovery response to the discovery request. The discovery response indicates a discovered at least one media NF type node and at least one corresponding NF profile. The at least one corresponding NF profile comprising at least one of one or more media types, one or more supported codecs, and transcoding support information.

In some embodiments, the first NF node is an Internet Protocol (IP) multimedia subsystem (IMS) node.

In some other embodiments, the IMS node is one of a proxy call session control function (P-CSCF) node, a media gateway control function (MGCF) node and an IMS application server (IMS-AS) node.

In one embodiment, the discovery request is transmitted as a result of a message that indicates a request for a media type communication for a UE, and the discovered at least one media NF type node is selected to serve the media type communication for the UE.

In another embodiment, the discovery request further indicates location information for the UE, the location information for the UE including at least one of a cell identifier associated with UE and network provided location information, NPLI, for the UE.

In some embodiments, the message that indicates the request for the media type communication for the UE is any one of: a session initiation protocol (SIP) message from the UE; a SIP invite message; and the SIP invite message including a P-Access-Network-Info (PANI) SIP header.

In some embodiments, the at least one corresponding NF profile further comprises one or more H.248 capabilities.

In one embodiment, the discovered at least one media NF type node has profile information corresponding to at least one parameter indicated in the discovery request.

In another embodiment, at least one of: the discovery request is transmitted to another network node comprising a network repository function (NRF) node; the discovery response is received from the other network node; and the other network node is provisioned with at least one NF profile corresponding to the at least one media NF type node.

In some embodiments, the method further includes transmitting, to the other network node, a subscription request to be notified about one of an added media NF type node and an NF profile update of an existing media NF type node; and receiving, from the other network node, a notification upon detection of the one of the added media NF type node and the NF profile update.

According to another aspect, a network node is described. The network node comprises a first network function (NF) node and processing circuitry configured to cause the network node to transmit a discovery request to trigger a discovery of at least one media NF type node. The discovery request indicates a media NF type of at least one media NF type node. The media NF type is one of an access media gateway (A-MGW), an Internet Protocol (IP) multi-media gateway (IM-MGW), and a media resource function (MRF). The processing circuitry is further configured to cause the network node to receive a discovery response to the discovery request. The discovery response indicates a discovered at least one media NF type node and at least one corresponding NF profile. The at least one corresponding NF profile comprises at least one of one or more media types, one or more supported codecs, and transcoding support information.

In some embodiments, the first NF node is an Internet Protocol (IP) multimedia subsystem (IMS) node.

In some other embodiments, the IMS node is one of a proxy call session control function (P-CSCF) node, a media gateway control function (MGCF) node and an IMS application server (IMS-AS) node.

In one embodiment, the discovery request is transmitted as a result of a message that indicates a request for a media type communication for a UE, and the discovered at least one media NF type node is selected to serve the media type communication for the UE.

In another embodiment, the discovery request further indicates location information for the UE, the location information for the UE including at least one of a cell identifier associated with UE and network provided location information, NPLI, for the UE.

In some embodiments, the message that indicates the request for the media type communication for the UE is any one of: a session initiation protocol (SIP) message from the UE; a SIP invite message; and the SIP invite message including a P-Access-Network-Info (PANI) SIP header.

In some embodiments, the at least one corresponding NF profile further comprises one or more H.248 capabilities.

In one embodiment, the discovered at least one media NF type node has profile information corresponding to at least one parameter indicated in the discovery request.

In another embodiment, at least one of: the discovery request is transmitted to another network node comprising a network repository function (NRF) node; the discovery response is received from the other network node; and the other network node is provisioned with at least one NF profile corresponding to the at least one media NF type node.

In some embodiments, the method further includes transmitting, to the other network node, a subscription request to be notified about one of an added media NF type node and an NF profile update of an existing media NF type node; and receiving, from the other network node, a notification upon detection of the one of the added media NF type node and the NF profile update.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1A:
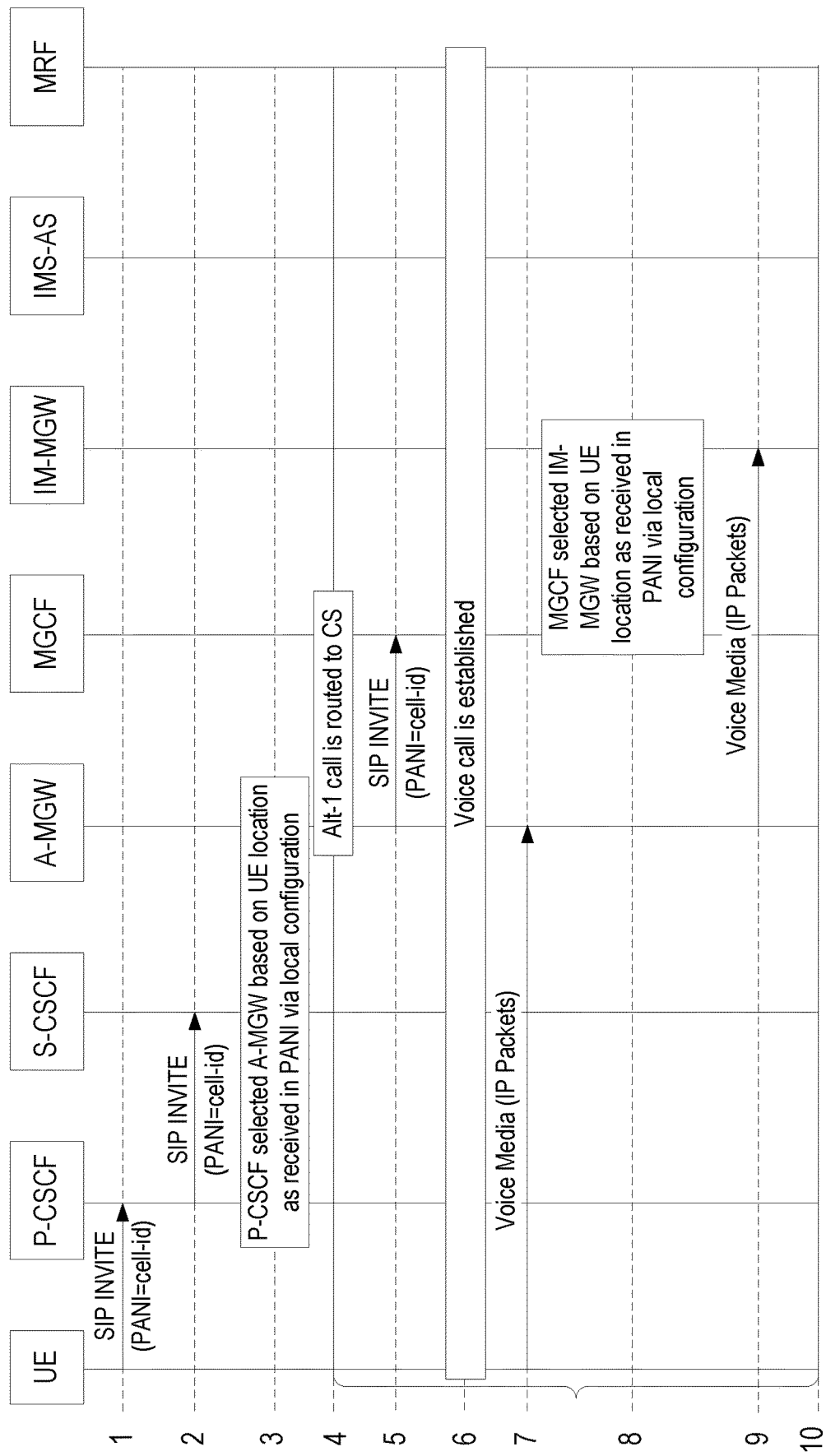
FIG. 1A is a call flow diagram illustrating an example IMS arrangement for media gateway selection.

In one aspect, some embodiments of the present disclosure provide arrangements to include new functionality in e.g., 3GPP according to one or more of the following:
 a network repository function (NRF) is enhanced to be able to host/register new NF profile information for new NF types, such as one or more of:
 A-MGW;
 IM-MGW; and/or
 MRF.

In some embodiments, the specific information for one or more of these new types of NFs are also part of the NF's profile. Non-limiting examples of this new NF profile information for the new NF types include one or more of:
 Codec support information, e.g., enhanced voice service (EVS), adaptive multi-rate wideband (AMR-WB), adaptive multi-rate narrowband (AMR-NB), G.711, H.264, etc.
 Transcoding support information (e.g., AMR-WB<->G.711 transcoding supported).
 Area of service (e.g., list of Cell IDs).
 H.248 capabilities (e.g., protocol version).
 IMS nodes are enhanced to discover and/or subscribe to these new NF types, leveraging the NRF capabilities in 5GC to provide a unique repository for this information.

In some embodiments, IMS nodes (especially the 5GC (service-based interface) SBI capable nodes, e.g., P-CSCF, IMS-AS, etc.) and/or any NF nodes are configured to discover MGWs in the network by reusing the existing NRF services. In some embodiments, IMS nodes and/or any NF nodes may also subscribe to MGW NF profile changes, so that when an MGW/media function configuration is updated or introduced at the MGW, all the subscribed IMS nodes and/or any subscribed NF nodes are notified immediately about it and may act accordingly, such as reconfiguring themselves with the updated information.

In some embodiments, an NRF is provisioned/configured with the MGW/media function information in a first step (e.g., 3GPP may allow the NRF to be provisioned with the new NFs' information via O&M); this does not preclude that the MGW can register its profile in NRF by using existing NRF services defined in 5GC.

One or more of the embodiments described herein may have one or more of the following advantages:
- Provides a unique point of configuration (NRF) (or NF registration from the MGW to the NRF) for the entire IMS domain when it comes to media gateways.
- Decreases and simplifies substantially the configuration and maintenance in IMS nodes by allowing IMS nodes or any NFs to discover MGWs based on one or many factors (e.g., UE location area) in e.g., an automated manner.

Before describing in detail exemplary embodiments, it is noted that the embodiments reside primarily in combinations of apparatus components and processing steps related to media gateway dynamic discovery in IMS. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

In some embodiments, the non-limiting terms wireless device (WD) or a user equipment (UE) are used interchangeably. The UE herein can be any type of wireless device capable of communicating with a network node or another UE over radio signals. In some embodiments, the UE may be an autonomous machine configured to communicate via IMS. The UE herein can by any type of communication device capable of communicating with another UE, an application server (AS), a network node, a server, an IMS NF or other IMS network node, via a wired connection and/or a wireless connection. The UE may also be a radio communication device, target device, device to device (D2D) UE, machine type UE or UE capable of machine to machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

In some embodiments, the term "node" is used herein and can be any kind of network node, such as, NRF node, NF node, IMS node, AF node, etc. In some embodiments, a node can be a Proxy-Call Session Control Function (P-CSCF) node, a mobility management node (e.g., Mobility Management Entity (MME) and/or Access and Mobility Function (AMF)), a gateway node (e.g., access gateway), a session management node (e.g., session management function (SMF) node), a user plane function (UPF) node, an AS node or any network node. In some embodiments, the network node may be, for example, a subscriber database node (e.g., unified data repository (UDR), home subscriber server (HSS)), a core network node, a Fifth Generation (5G) and/or New Radio (NR) network node, an Evolved Packet System (EPS) node, an Internet Protocol (IP) Multimedia Subsystem (IMS) node, an Serving-CSCF node, an Interrogating-CSCF node, a network repository function (NRF) node, a unified data management (UDM) node, a Network Exposure Function (NEF) node, a home subscriber server (HSS) node, a home location register (HLR) node, etc.

In yet other embodiments, the network node may include any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, integrated access and backhaul (IAB), donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some other embodiments, the term NF node can be and/or comprise a P-CSCF node, a media NF type node (i.e., an NF associated with processing/handling/transferring/routing of media and/or any other process step associated with media and/or media type communication, e.g., a media type communication for a UE), an A-MGW, an ATGW, IM-MGW, IWK-MGW, an MGCF, IMS-AS, an MRF, etc. However, the NF node is not limited as such and may be and/or comprise any type of node. Further, a media NF type node may refer to one or more of a P-CSCF node (and/or any CSCF node), an A-MGW, an ATGW, IM-MGW, IWK-MGW, an MGCF, IMS-AS, an MRF, any other node described herein, etc.

In some embodiments, a Third Generation Partnership Project (3GPP) core network (e.g., 5GC) may include a Service Based Architecture (SBA) in which Network Functions (NFs) provide one or more services to one or more service consumers. This can be performed, for example, via Hyper Text Transfer Protocol/Representational State Transfer (HTTP/REST), application programming interfaces (APIs), etc. Generally, the various services may be considered self-contained functionalities that can be changed and modified in an isolated manner without affecting other services. Furthermore, the services may include various service operations, which may be more granular divisions of the overall service functionality. In some embodiments, in order to access a service, both the service name and the targeted service operation is to be indicated. The interactions between service consumers and service producers may be, for example, a "request/response" or "subscribe/notify" type or yet other types of interactions.

In some embodiments, one or more of the nodes described herein may be more generally considered and/or comprise an application function (AF) and may be referred to as an AF node. For example, the NRF node, NF node, IMS node, described herein may be more generally referred to as AF node.

In some embodiments, the various AF nodes and NF nodes that may be described herein may be referred to by their function names and/or more generally as network nodes and/or nodes.

A node described herein may include physical components, such as processors, allocated processing elements, or other computing hardware, computer memory, communication interfaces, and other supporting computing hardware. The node may use dedicated physical components, or the node may be allocated use of the physical components of another device, such as a computing device or resources of a datacenter, in which case the node may be said to be virtualized. A node may be associated with multiple physical components that may be located either in one location, or may be distributed across multiple locations.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices corresponding to a table, and/or one or more bit patterns representing the information.

In some embodiments, the term "media" may indicate video, voice over IP, circuit switched voice call, etc.

Although some embodiments are described with reference to an NRF, it should be understood that the principles of the present disclosure may also be applied to an NF that operates the same or substantially similar to the NRF, i.e., allowing NFs to discover the services offered by other NFs and/or subscribing to NFs.

Note also that some embodiments of the present disclosure may be supported by standard documents disclosed in Third Generation Partnership Project (3GPP) technical specifications. That is, some embodiments of the description can be supported by the above documents. In addition, all the terms disclosed in the present document may be described by the above standard documents.

Note that although terminology from one particular wireless system, such as, for example, $3^{rd}$ Generation Partnership Project (3GPP), Long Term Evolution (LTE), $5^{th}$ Generation (5G) and/or New Radio (NR), may be used in this disclosure, this should not be seen as limiting the scope of the disclosure to only the aforementioned system. Other wireless systems, including without limitation 3GPP 6th Generation (6G) or later Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a NRF node, NF node described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

With that being said, it should be understood that, in some embodiments, the names used may not be limited to the specific names used herein, which may be exemplary and/or descriptive since it may be given another name in a technical specification, such as a 3GPP Technical Specification (TS) even though the use/function is as disclosed in the present disclosure.

Figure 2:
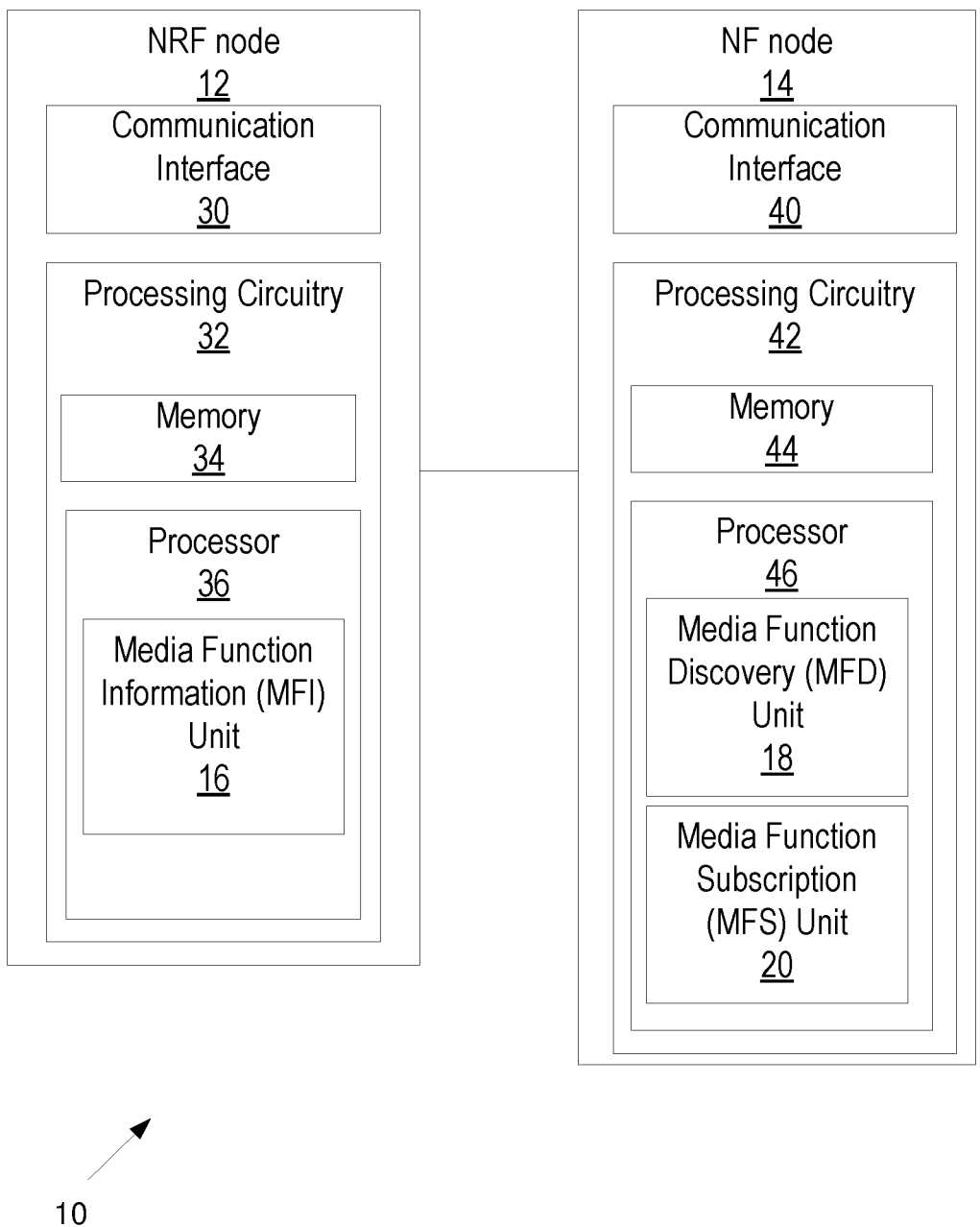
FIG. 2 illustrates an example system architecture and example hardware arrangements for devices in the system, according to some embodiments of the present disclosure.

Referring again to the drawing figures, in which like elements are referred to by like reference numerals, there is shown in FIG. 2 a schematic diagram of a communication system 10, according to one embodiment, constructed in accordance with the principles of the present disclosure. The communication system 10 in FIG. 2 is a non-limiting example and other embodiments of the present disclosure may be implemented by one or more other systems and/or networks. Referring to FIG. 2, system 10 includes a NRF node 12 and a NF node 14. In some embodiments, the NF node 14 may be any IMS node. In some embodiments, the NF node 14 may be any of the NFs discussed herein.

It should be understood that the system 10 may include numerous nodes of those shown in FIG. 2, as well as additional nodes not shown in FIG. 2. In addition, the system 10 may include many more connections/interfaces than those shown in FIG. 2.

The system 10 may include one or more nodes having a media function information (MFI) unit 16, a media function discovery (MFD) unit 18 and a media function subscription (MFS) unit 20.

In one embodiment, NRF node 12 includes a MFI unit 16 which is configured to cause the network node to: receive a discovery request from a first network function (NF) node, the discovery request indicating at least one media-related information associated with a user equipment (UE); discover at least one second NF node based at least in part on the media-related information; and send a discovery response to the discovery request, the discovery response indicating the discovered at least one second NF node.

In another embodiment, NF node 14 includes an MFD unit 18 and an MFS unit 20, which is configured to cause the network node to: send a discovery request, the discovery request indicating at least one media-related information associated with a user equipment (UE); and receive a discovery response to the discovery request, the discovery response indicating at least one second NF node, the at least one second NF node being discovered based at least in part on the media-related information.

Example implementations, in accordance with some embodiments, of NFR node 12 and NF node 14, which may include any of the devices/nodes discussed herein and will now be described with reference to FIG. 2.

The NRF node 12 includes a communication interface 30, processing circuitry 32, and memory 34. The communication interface 30 may be configured to communicate with other elements in the system 10 according to some embodiments of the present disclosure. In some embodiments, the communication interface 30 may be formed as or may include, for example, one or more radio frequency (RF) transmitters, one or more RF receivers, and/or one or more RF transceivers, and/or may be considered a radio interface. In some embodiments, the communication interface 30 may also include a wired interface.

The processing circuitry 32 may include one or more processors 36 and memory, such as, the memory 34. In particular, in addition to a traditional processor and memory, the processing circuitry 32 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 36 may be configured to access (e.g., write to and/or read from) the memory 34, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the NRF node 12 may further include software stored internally in, for example, memory 34, or stored in external memory (e.g., database) accessible by the NRF node 12 via an external connection. The software may be executable by the processing circuitry 32. The processing circuitry 32 may be configured to control any of the methods and/or processes described herein and/or to cause such methods, and/or processes to be performed, e.g., by the NRF node 12. The memory 34 is configured to store data, programmatic software code and/or other information described herein. In some embodiments, the software may include instructions stored in memory 34 that, when executed by the processor 36 and/or media function information (MFI) unit 16, causes the processing circuitry 32 and/or configures the NRF node 12 to perform the processes described herein with respect to the NRF node 12 (e.g., processes described with reference to FIG. 3 and/or any of the other figures).

The NF node 14 includes a communication interface 40, processing circuitry 42, and memory 44. The communication interface 40 may be configured to communicate with any of the nodes in the system 10 according to some embodiments of the present disclosure. In some embodiments, the communication interface 40 may be formed as or may include, for example, one or more radio frequency (RF) transmitters, one or more RF receivers, and/or one or more RF transceivers, and/or may be considered a radio interface. In some embodiments, the communication interface 40 may also include a wired interface.

The processing circuitry 42 may include one or more processors 46 and memory, such as, the memory 44. In particular, in addition to a traditional processor and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 46 may be configured to access (e.g., write to and/or read from) the memory 44, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the NF node 14 may further include software stored internally in, for example, memory 44, or stored in external memory (e.g., database) accessible by the NF node 14 via an external connection. The software may be executable by the processing circuitry 42. The processing circuitry 42 may be configured to control any of the methods and/or processes described herein and/or to cause such methods, and/or processes to be performed, e.g., NF node 14. The memory 44 is configured to store data, programmatic software code and/or other information described herein. In some embodiments, the software may include instructions stored in memory 44 that, when executed by the processor 46 and/or media function discovery (MFD) unit 18 and/or media function subscription (MFS) unit 20 causes the processing circuitry 42 and/or configures the NF node 14 to perform the processes described herein with respect to the NF node 14 (e.g., processes described with reference to FIG. 4 and/or any of the other figures).

In FIG. 2, the connection between the devices NF node 14 and NRF node 12 is shown without explicit reference to any intermediary devices or connections. However, it should be understood that intermediary devices and/or connections may exist between these devices, although not explicitly shown.

Although FIG. 2 shows various "units", such as MFI unit 16, MFD unit 18, MFS unit 20, as being within a respective processor, it is contemplated that these elements may be implemented such that a portion of the elements is stored in a corresponding memory within the processing circuitry. In other words, the elements may be implemented in hardware or in a combination of hardware and software within the processing circuitry.

Figure 1B:
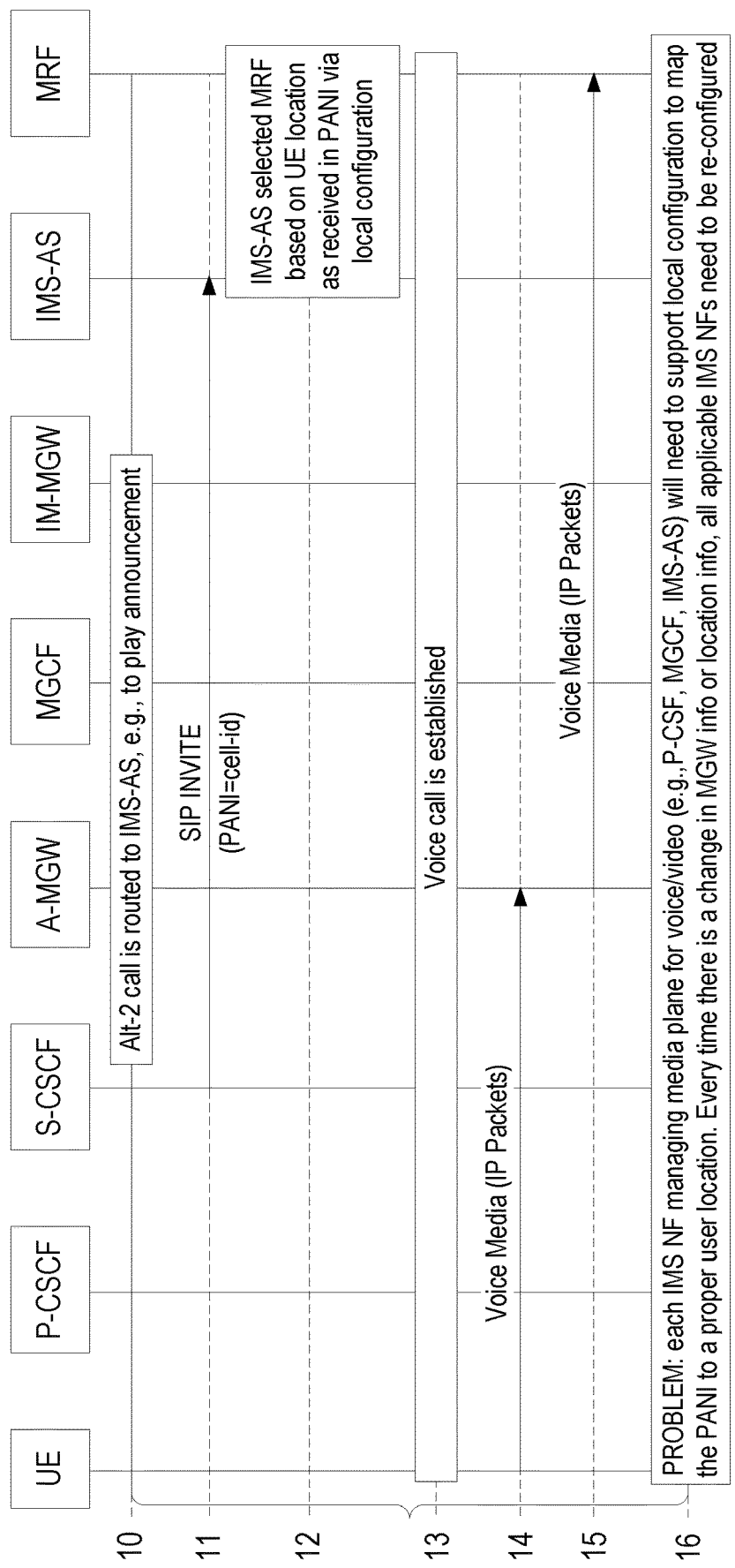
FIG. 1B is a continuation of the call flow diagram of FIG. 1A.

In some embodiments, the inner workings of the NRF node 12 and NF node 14 from FIG. 2 may be as shown in FIG. 2 and independently, the surrounding network topology may be that of FIGS. 1 and/or 7A and/or 7B and/or 7C, where the NF node 14 may be any of the nodes shown in FIGS. 1 and/or 7A and/or 7B and/or 7C.

Figure 3:
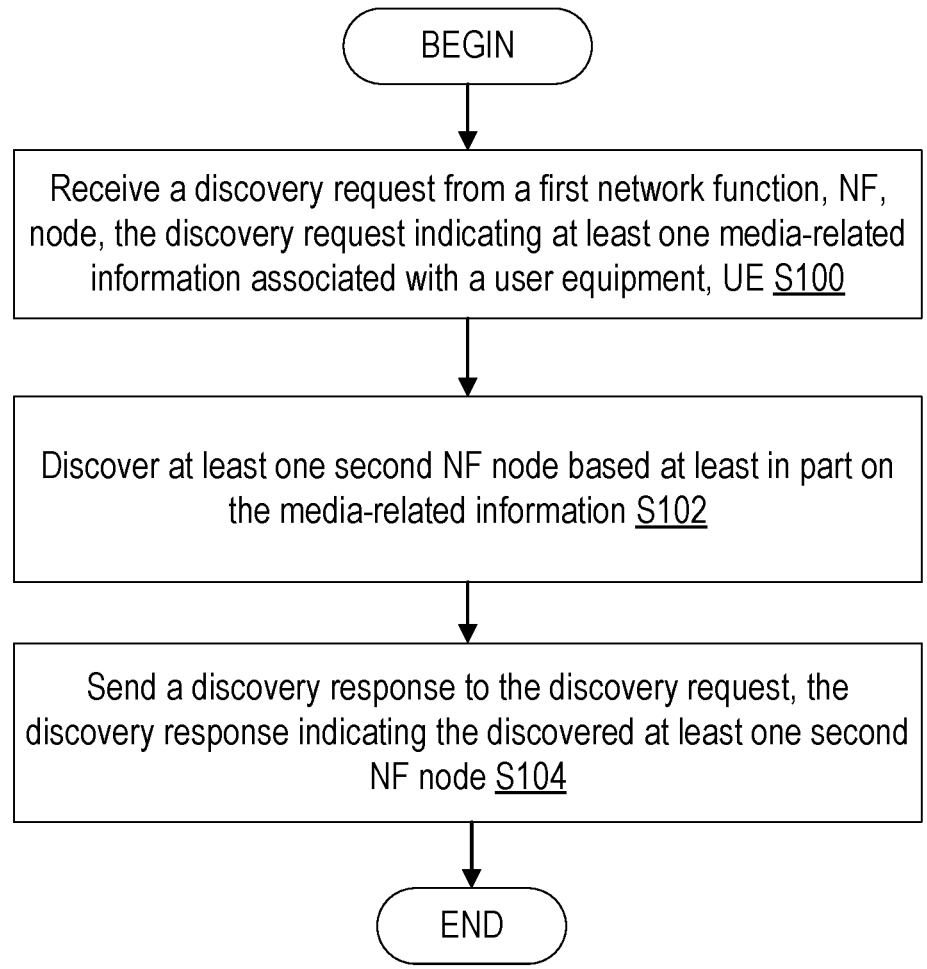
FIG. 3 is a flowchart of an example process in NFR node according to some embodiments of the present disclosure.

FIG. 3 is a flowchart of an example process in NRF node e.g., NRF node 12 according to some embodiments of the present disclosure. One or more Blocks and/or functions and/or methods performed by the NRF node 12 may be performed by one or more elements of NRF node 12 such as MFI unit 16 in processing circuitry 32, memory 34, processor 36, communication interface 30, etc. according to the example process/method. The example process includes receiving (Block S100), such as via MFI unit 16, processing circuitry 32, memory 34, processor 36 and/or communication interface 30, a discovery request from a first network function (NF) node, the discovery request indicating at least one media-related information associated with a user equipment, UE. The method includes discovering (Block S102), such as via MFI unit 16, processing circuitry 32, memory 34, processor 36 and/or communication interface 30, at least one second NF node based at least in part on the media-related information. The method includes sending (Block S104), such as via MFI unit 16, processing circuitry 32, memory 34, processor 36 and/or communication interface 30, a discovery response to the discovery request, the discovery response indicating the discovered at least one second NF node.

In some embodiments, the discovered at least one second NF node comprises a media NF type node. In some embodiments, the media NF type node is one of an access media gateway (A-MGW), an Internet Protocol (IP) multi-media gateway (IM-MGW), and a media resource function (MRF). In some embodiments, the requesting first NF node is an Internet Protocol (IP) multimedia subsystem (IMS) node. In some embodiments, the IMS node is one of a proxy call session control function (P-CSCF) node, a media gateway control function (MGCF) node and an IMS application server (IMS-AS) node. In some embodiments, the discovery request indicating the at least one media-related information is received as a result of a message that indicates a request for a media type communication for the UE and wherein the discovered at least one second NF node is selected to serve the media type communication for the UE.

In some embodiments, the at least one media-related information associated with the UE comprises a location information for the UE, a media type requested by the UE and at least one codec supported by the UE. In some embodiments, the location information for the UE comprises a cell identifier associated with UE and network provided location information (NPLI) for the UE. In some embodiments, the at least one media-related information associated with the UE at least one of: is based on information in a session initiation protocol (SIP) message from the UE; is based on information in a SIP INVITE message; is based on information in a P-Access-Network-Info (PANI) SIP header; and/or comprises a target media NF type node that the at least one second NF node is requesting to be discovered to serve the UE.

In some embodiments, discovering the at least one second NF node further comprises discovering, such as via MFI unit 16, processing circuitry 32, memory 34, processor 36 and/or communication interface 30, the at least one second NF node having profile information corresponding to the media-related information associated with the UE. In some embodiments, discovering the at least one second NF node having profile information corresponding to the media-related information comprises at least one of: discovering the at least one second NF node having profile information indicating support for at least one codec supported by the UE; discovering the at least one second NF node having profile information indicating a location proximity to the UE; and/or discovering the at least one second NF node having profile information indicating a media NF type node that is requested by the first NF node for the UE.

In some embodiments, the network node comprises a network repository function, NRF. In some embodiments, the network node is provisioned with profile information for at least one NF node in the at least one second NF node. In some embodiments, at least one NF node in the at least one second NF node requests to register profile information to the network node. In some embodiments, the method further includes receiving, such as via MFI unit 16, processing circuitry 32, memory 34, processor 36 and/or communication interface 30, a subscription request to be notified about one of an addition of a new media NF type node and a profile information update of an existing media NF type node; and sending, such as via MFI unit 16, processing circuitry 32, memory 34, processor 36 and/or communication interface 30, a notification upon detection of the one of the addition and the profile information update.

Figure 4:
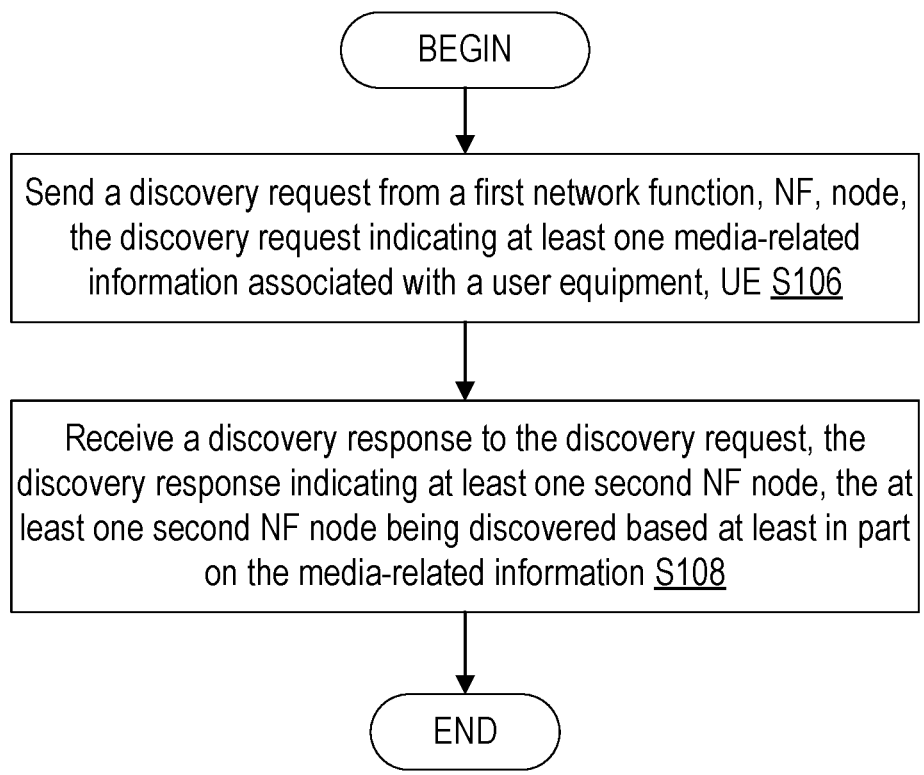
FIG. 4 is a flowchart of an example process in NF node according to some embodiments of the present disclosure.

FIG. 4 is a flowchart of an example process in a NF or AF node e.g., NF node 14 according to some embodiments of the present disclosure. One or more Blocks and/or functions and/or methods performed by the NF node 14 may be performed by one or more elements of NF node 14 such as by MFD unit 18, MFS unit 20 in processing circuitry 42, memory 44, processor 46, communication interface 40, etc. according to the example process/method. The example process includes sending (Block S106), such as via MFD unit 18, MFS unit 20, processing circuitry 42, memory 44, processor 46, and/or communication interface 40, a discovery request, the discovery request indicating at least one media-related information associated with a user equipment, UE. The method includes receiving (Block S108), such as via MFD unit 18, MFS unit 20, processing circuitry 42, memory 44, processor 46, and/or communication interface 40, a discovery response to the discovery request, the discovery response indicating at least one second NF node, the at least one second NF node being discovered based at least in part on the media-related information.

In some embodiments, the discovered at least one second NF node comprises a media NF type node. In some embodiments, the media NF type node is one of an access media gateway (A-MGW), an Internet Protocol (IP) multi-media gateway (IM-MGW), and a media resource function (MRF). In some embodiments, the network node is an Internet Protocol (IP) multimedia subsystem (IMS) node. In some embodiments, the IMS node is one of a proxy call session control function (P-CSCF) node, a media gateway control function (MGCF) node and an IMS application server (IMS-AS) node. In some embodiments, the discovery request indicating the at least one media-related information is sent as a result of a message that indicates a request for a media type communication for the UE and wherein the discovered at least one second NF node is selected to serve the media type communication for the UE.

In some embodiments, the at least one media-related information associated with the UE comprises a location information for the UE, a media type requested by the UE and at least one codec supported by the UE. In some embodiments, the location information for the UE comprises a cell identifier associated with UE and network provided location information (NPLI) for the UE. In some embodiments, the at least one media-related information associated with the UE at least one of: is based on information in a session initiation protocol (SIP) message from the UE; is based on information in a SIP message is a SIP INVITE message; is based on information in a P-Access-Network-Info (PANI) SIP header; and/or comprises a target media NF type node that the network node is requesting to be discovered to serve the UE.

In some embodiments, the at least one second NF node is discovered based at least in part on the at least one second NF node having profile information corresponding to the media-related information associated with the UE. In some embodiments, the at least one second NF node is discovered based at least in part on at least one of: the at least one second NF node having profile information indicating support for at least one codec supported by the UE; the at least one second NF node having profile information indicating a location proximity to the UE; and the at least one second NF node having profile information indicating a media NF type node that is requested by the network node for the UE.

In some embodiments, the discovery request is sent to a network repository function, NRF, node. In some embodiments, profile information for at least one NF node in the at least one second NF node is provisioned to the NRF node. In some embodiments, profile information for at least one NF node in the at least one second NF node is registered to the NRF node. In some embodiments, the method further includes sending, such as via MFD unit 18, MFS unit 20, processing circuitry 42, memory 44, processor 46, and/or communication interface 40, a subscription request to be notified about one of an addition of a new media NF type node and a profile information update of an existing media NF type node; and receiving, such as via MFD unit 18, MFS unit 20, processing circuitry 42, memory 44, processor 46, and/or communication interface 40, a notification upon detection of the one of the addition and the profile information update.

Figure 5:
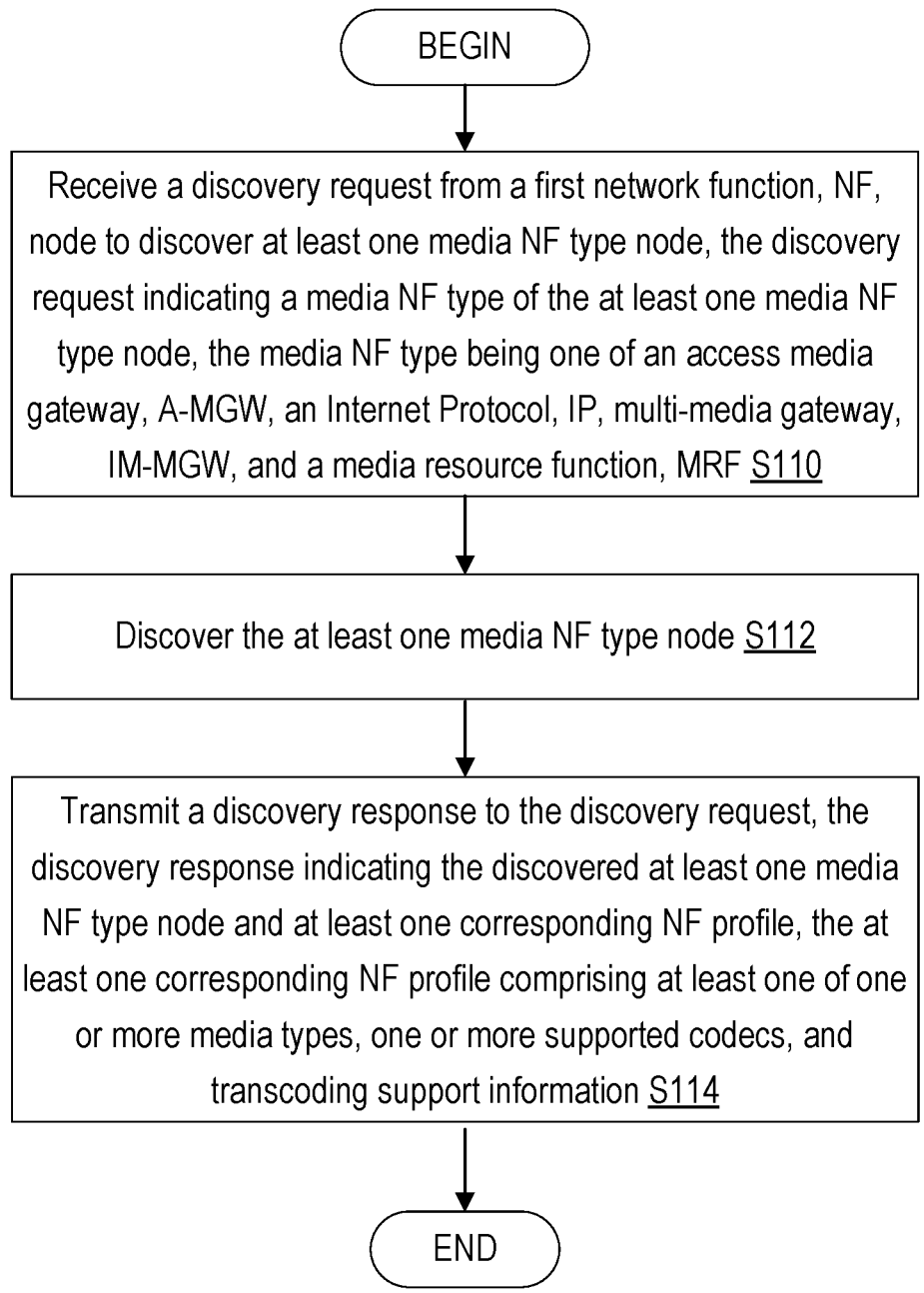
FIG. 5 is a flowchart of another example process in NFR node according to some embodiments of the present disclosure.

FIG. 5 is a flowchart of another example process in NRF node e.g., NRF node 12 according to some embodiments of the present disclosure. One or more Blocks and/or functions and/or methods performed by the NRF node 12 may be performed by one or more elements of NRF node 12 such as MFI unit 16 in processing circuitry 32, memory 34, processor 36, communication interface 30, etc. according to the example process/method. The method includes receiving (Block S110), such as via MFI unit 16, processing circuitry 32, memory 34, processor 36 and/or communication interface 30, a discovery request from a first network function (NF) node 14a to discover at least one media NF type node, the discovery request indicating a media NF type of the at least one media NF type node 14b. The media NF type is one of an access media gateway (A-MGW), an Internet Protocol (IP) multi-media gateway (IM-MGW), and a media resource function (MRF). The method further includes discovering (Block S112), such as via MFI unit 16, processing circuitry 32, memory 34, processor 36 and/or communication interface 30, the at least one media NF type node 14b; and transmitting (Block S114), such as via MFI unit 16, processing circuitry 32, memory 34, processor 36 and/or communication interface 30, a discovery response to the discovery request. The discovery response indicates the discovered at least one media NF type node 14b and at least one corresponding NF profile. The at least one corresponding NF profile comprise at least one of one or more media types, one or more supported codecs, and transcoding support information.

In some embodiments, the first NF node 14a is an Internet Protocol (IP) multimedia subsystem (IMS) node.

In some other embodiments, the IMS node is one of a proxy call session control function (P-CSCF) node, a media gateway control function (MGCF) node and an IMS application server (IMS-AS) node.

In one embodiment, the discovery request further indicates at least one of the one or more media types, the one or more supported codecs, and the transcoding support information required to be supported by the at least one media NF type node 14b, and discovering the at least one media NF type node further comprises discovering the at least one media NF type node supporting the at least one of one or more media types, one or more supported codecs, and transcoding support information indicated in the discovery request.

In another embodiment, the discovery request further indicates location information for the UE, the location information for the UE including at least one of a cell identifier associated with UE and network provided location information, NPLI, for the UE.

In some embodiments, the at least one corresponding NF profile further comprises one or more H.248 capabilities.

In one embodiment, discovering the at least one media NF type node 14b further comprises discovering the at least one media NF type node 14b having profile information corresponding to at least one parameter indicated in the discovery request.

In another embodiment, at least one of: the network node comprises a network repository function, NRF, node 12; and the network node is provisioned with at least one NF profile corresponding to the at least one media NF type node 14b.

In some embodiments, the method further includes, such as via MFI unit 16, processing circuitry 32, memory 34, processor 36 and/or communication interface 30, receiving a subscription request to be notified about one of an added media NF type node and an NF profile update of an existing media NF type node; and transmitting a notification upon detection of the one of the added media NF type node and the NF profile update.

Figure 6:
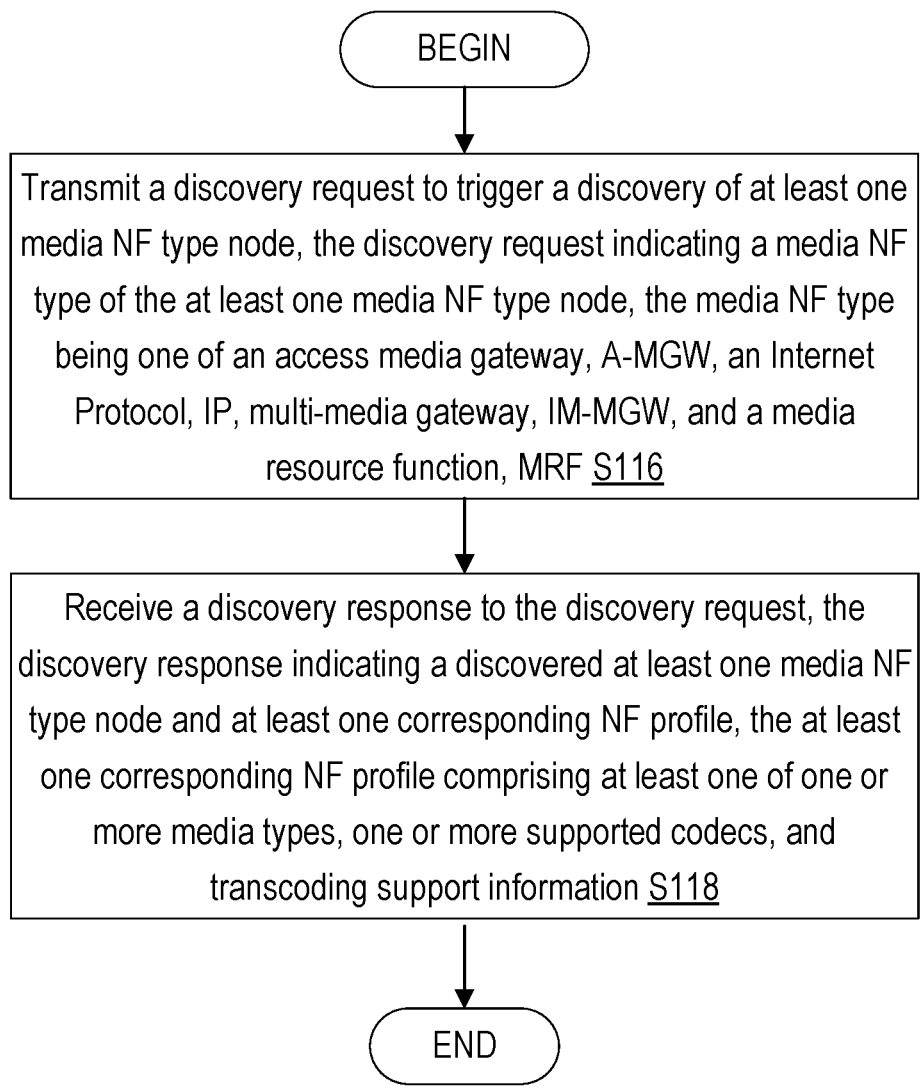
FIG. 6 is a flowchart of another example process in NF node according to some embodiments of the present disclosure.

FIG. 6 is a flowchart of another example process in a network node, e.g., NF node 14 according to some embodiments of the present disclosure. One or more Blocks and/or functions and/or methods performed by the NF node 14 may be performed by one or more elements of NF node 14 such as by MFD unit 18, MFS unit 20 in processing circuitry 42, memory 44, processor 46, communication interface 40, etc. according to the example process/method. The example process includes transmitting (Block S116), such as via MFD unit 18, MFS unit 20, processing circuitry 42, memory 44, processor 46, and/or communication interface 40, a discovery request to trigger a discovery of at least one media NF type node 14b. The discovery request indicates a media NF type of the at least one media NF type node 14b. The media NF type is one of an access media gateway (A-MGW), an Internet Protocol (IP) multi-media gateway (IM-MGW), and a media resource function (MRF); and receiving (Block S118), such as via MFD unit 18, MFS unit 20, processing circuitry 42, memory 44, processor 46, and/or communication interface 40, a discovery response to the discovery request. The discovery response indicates a discovered at least one media NF type node 14b and at least one corresponding NF profile. The at least one corresponding NF profile comprises at least one of one or more media types, one or more supported codecs, and transcoding support information.

In some embodiments, the first NF node 14a is an Internet Protocol (IP) multimedia subsystem (IMS) node.

In some other embodiments, the IMS node is one of a proxy call session control function (P-CSCF) node, a media gateway control function (MGCF) node and an IMS application server (IMS-AS) node.

In one embodiment, the discovery request is transmitted as a result of a message that indicates a request for a media type communication for a UE, and the discovered at least one media NF type node 14b is selected to serve the media type communication for the UE.

In another embodiment, the discovery request further indicates location information for the UE, the location information for the UE including at least one of a cell identifier associated with UE and network provided location information, NPLI, for the UE.

In some embodiments, the message that indicates the request for the media type communication for the UE is any one of: a session initiation protocol (SIP) message from the UE; a SIP invite message; and the SIP invite message including a P-Access-Network-Info (PANI) SIP header.

In some other embodiments, the at least one corresponding NF profile further comprises one or more H.248 capabilities.

In one embodiment, the discovered at least one media NF type node 14b has profile information corresponding to at least one parameter indicated in the discovery request.

In another embodiment, at least one of: the discovery request is transmitted to another network node comprising a network repository function (NRF) node 12; the discovery response is received from the other network node; and the other network node is provisioned with at least one NF profile corresponding to the at least one media NF type node 14b.

In some embodiments, the method further includes, such as via MFD unit 18, MFS unit 20, processing circuitry 42, memory 44, processor 46, and/or communication interface 40, transmitting, to the other network node, a subscription request to be notified about one of an added media NF type node and an NF profile update of an existing media NF type node; and receiving, from the other network node, a notification upon detection of the one of the added media NF type node and the NF profile update.

Having generally described arrangements for media gateway dynamic discovery in IMS, a more detailed description of some of the embodiments are provided as follows with reference to FIGS. 5 and 6, and which may be implemented by one or more NF nodes 14 (e.g., IMS node, P-CSCF node, IMS-AS node, MGCF node, or any NF node configured to discover, subscribe to and otherwise utilize the services of the NRF) and the NRF node 12.

Figure 7A:
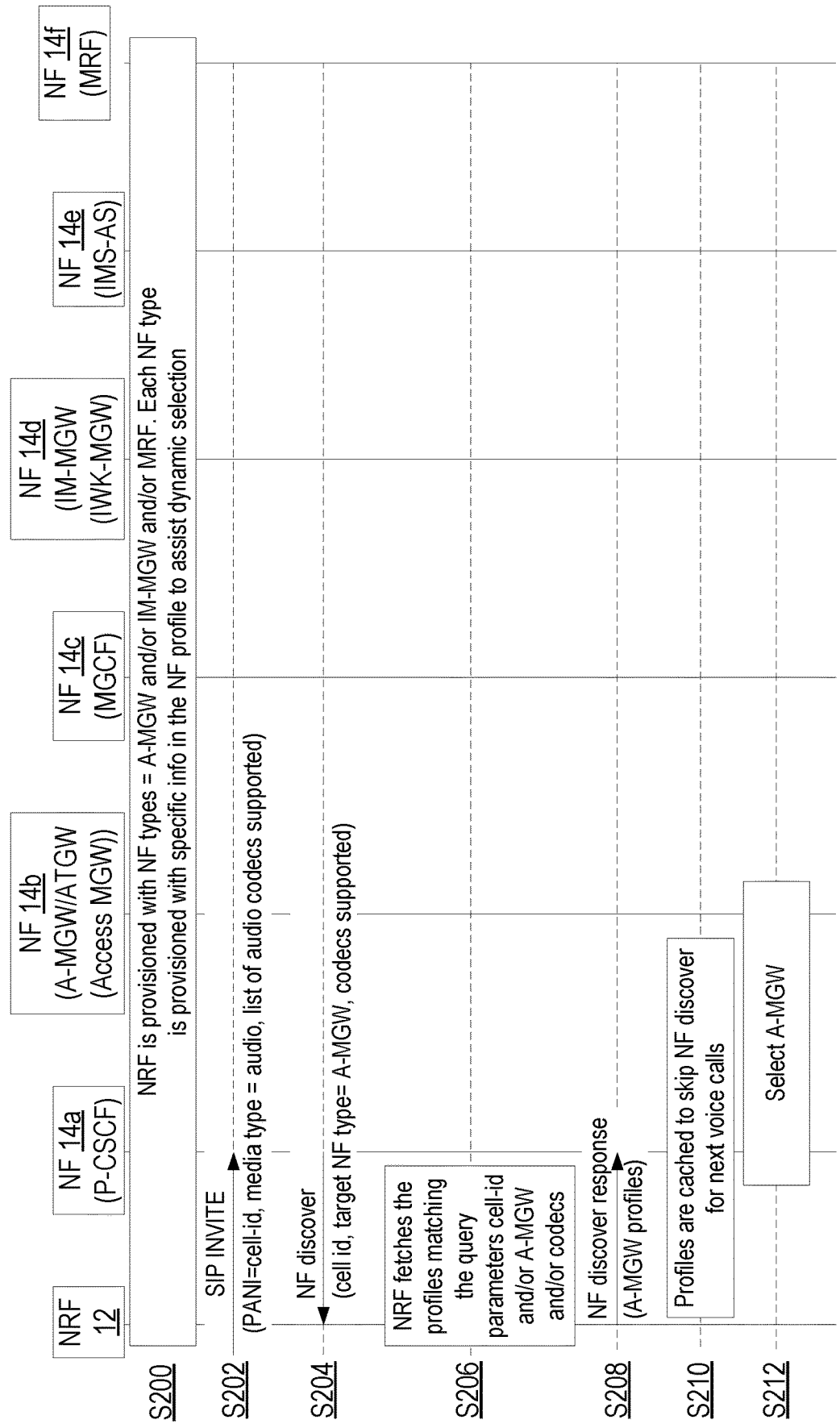
FIG. 7A is a call flow diagram illustrating an example IMS arrangement for media gateway selection according to some embodiments of the present disclosure.
Figure 7B:
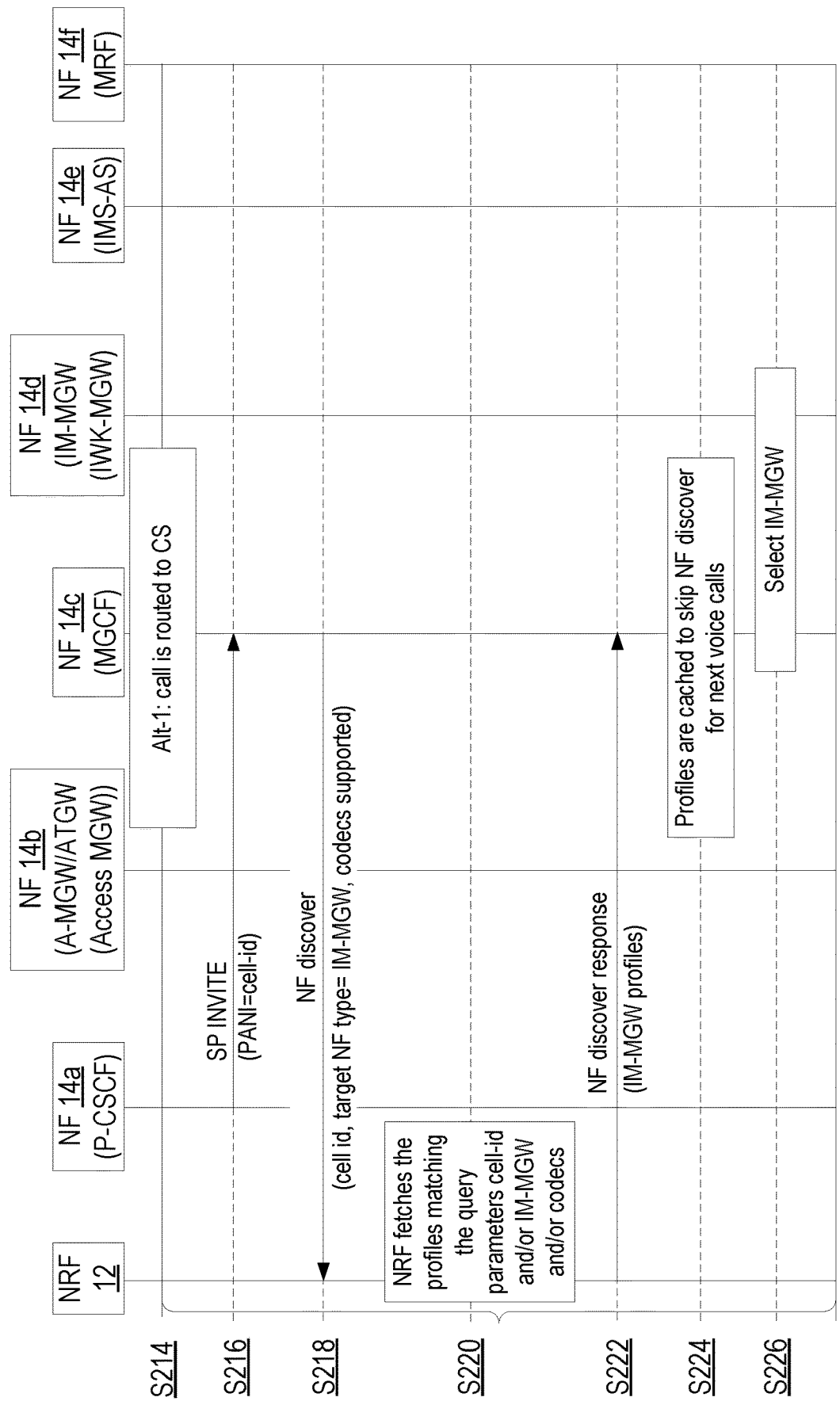
FIG. 7B is a continuation of the call flow diagram of FIG. 7A according to some embodiments of the present disclosure.
Figure 7C:
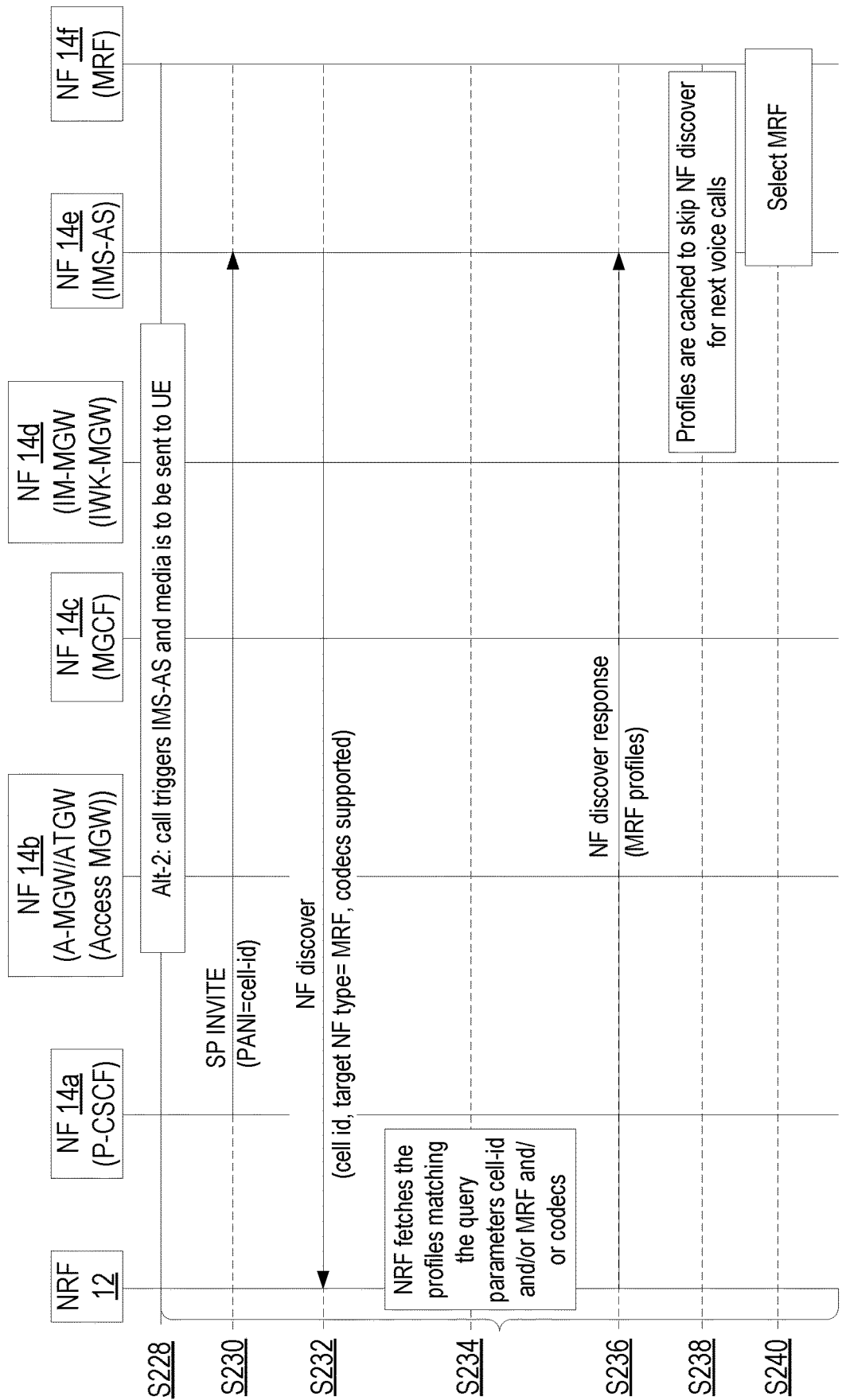
FIG. 7C is a continuation of the call flow diagram of FIGS. 7A and/or 7B according to some embodiments of the present disclosure.

FIGS. 7A, 7B, and 7C illustrate an example call flow arrangement according to some embodiments of the present disclosure. Although FIG. 7B is described as a continuation of the call flow diagram of FIG. 7A, and FIG. 7C is described as a continuation of the call flow diagram of FIGS. 7A and/or 7B any one of the steps S200-S240 may be performed in any order and/or be dependent/independent from any other step.

The example arrangement may include one or more of the following (each of P-CSCF (i.e., NF 14*a*), A-MGW (i.e., NF 14*b*), MGCF (i.e., NF 14*c*), IM-MGW (i.e., NF 14*d*), IMS-AS (i.e., NF 14*e*), MRF (i.e., NF 14*f*) may be a NF node 14):

Step S200 of FIG. 7A. NRF 12 is provisioned with new NF profile information associated to new NF types, which may be referred to herein as media NF types and which may include one or more of A-MGW, IM-MGW, MRF). The profile information contains specific information to be consumed by the IMS NFs, such as one or more of the following media-related information:

Codec support information, e.g., EVS, AMR-WB, AMR-NB, G.711, H.264

Transcoding support information (e.g., AMR-WB<->G.711 transcoding supported)

Area of service (e.g., list of Cell-Ids)

H.248 capabilities (e.g., protocol version)

Step S202. P-CSCF (i.e., NF 14*a*) receives a new (e.g., packet data unit/PDU) session establishment for a voice call, e.g., from a UE. The UE (i.e., session establishment) indicates the codecs supported and preferred, together with the access network information (e.g., cell ID). For example, the UE sends a session initiation protocol (SIP) invite message (via a radio access network (RAN), such as a gNB). The SIP invite message may include a "P-Access-Network-Info" (PANI) indicating the cell ID (e.g., cell ID identifying the cell used by the UE and being associated with the RAN). The SIP message may further include information about a media type, list of audio codecs supported, etc., which may be comprised in a session description protocol (SDP) within the SIP message.

Step S204. After ensuring that the information is correct (possibly retrieving the access network information from the network via network provided location information (NPLI)), P-CSCF (i.e., NF 14*a*) uses the information in a PANI header (which may be a type of SIP header) to discover A-MGWs (i.e., NF 14*b*) close/proximate to the UE and supporting the codecs offered by the UE. For example, P-CSCF (i.e., NF 14*a*) sends a discovery request to NRF 12 comprising criteria/information (e.g., location information for the UE, codecs offered by the UE, media NF type, etc.)

Step S206. NRF 12 searches and selects the NF profiles satisfying the criteria/information in the discovery message, e.g., close to UE location and/or supporting the codecs offered by the UE. The NF type of the selected NF profiles should match the requested NF type (e.g., A-MGW) and the rest of information (e.g., codecs, UE location information).

Step S208. NRF 12 returns the matched NF profiles with all the information provisioned, e.g., cell IDs/areas served by the A-MGW (i.e., NF 14*b*), codecs, etc. For example, the NRF 12 sends a discovery response indicating the matched NF profiles. In some embodiments, NRF 12 may return only A-MGWs (i.e., NF 14*b*) serving cell IDs/areas that are the same as the cell ID in the PANI or the NLPI.

Step S210. After caching the NF profiles received (to avoid subsequent discoveries if there is a local match against the cached NF profiles), in step S212, P-CSCF (i.e., NF 14*a*) selects a A-MGW (i.e., NF 14*b*) based on the information received and other standard NF profile information present (e.g., priority, capacity, as defined in 3GPP TS 29.510).

FIGS. 7B and 7C illustrate the continuation of the call flow diagram introduced in FIG. 7A, as follows:

Steps S214-S240. Similar NF discovery and caching NF profiles are performed by each IMS node which performs media control plane (e.g., MGCF (i.e., NF 14*c*), IMS-AS (i.e., NF 14*e*)), as shown in FIG. 7A.

Step S214. The call may be routed to a circuit switched (CS) network.

Step S216. P-CSCF (i.e., NF 14*a*) sends a SIP INVITE comprising a cell identifier to MGCF (i.e., NF 14*c*).

Step S218. MGCF (i.e., NF 14*c*) sends a discovery request to NRF 12. The discovery request may include the cell identifier, a target NF type=IM-MGW and/or codecs supported by the UE.

Step S220. NRF 12 fetches/discovers the profiles of NFs matching the query parameters in the discovery request.

Step S222. NRF 12 sends a discovery response to MGCF (i.e., NF 14*c*) comprising profile information for the matching NFs.

Step S224. The profile information may be cached at MGCF (i.e., NF 14*c*) so that it can skip NF discovery procedure for next media communication (e.g., voice call).

Step S226. MGCF (i.e., NF 14*c*) selects an IM-MGW (i.e., NF 14*d*) from the discovery response.

Step S228. A call may trigger an IMS-AS and media is to be sent to a UE.

Step S230. P-CSCF (i.e., NF 14*a*) sends a SIP INVITE comprising a cell identifier to IMS-AS (i.e., NF 14*e*).

Step S232. IMS-AS (i.e., NF 14*e*) sends a discovery request to NRF 12. The discovery request may include the cell identifier, a target NF type=MRF and/or codecs supported by the UE.

Step S234. NRF 12 fetches/discovers the profiles of NFs matching the query parameters in the discovery request.

Step S236. NRF 12 sends a discovery response to IMS-AS (i.e., NF 14*e*) comprising profile information for the matching NFs.

Step S238. The profile information may be cached at IMS-AS (i.e., NF 14*e*) so that it can skip NF discovery procedure for next media communication (e.g., voice call).

Step S240. IMS-AS (i.e., NF 14*e*) selects an MRF (i.e., NF 14*f*) from the discovery response.

In some embodiments, at any point in time after the caching of the NF profiles, the IMS NFs 14 may subscribe to NF profile changes for the e.g., NF profile instances cached or all the MGWs (i.e., NFs 14) in the network (to be notified when a new MGW is deployed or updated in the network).

The following is a list of nonlimiting example embodiments:

1. A method in a network node (12), the method comprising:

receiving (S100) a discovery request from a first network function, NF, node (14), the discovery request indicating at least one media-related information associated with a user equipment, UE;

discovering (S102) at least one second NF node (14) based at least in part on the media-related information; and sending (S104) a discovery response to the discovery request, the discovery response indicating the discovered at least one second NF node (14).

2. The method of Embodiment 1, wherein the discovered at least one second NF node (14) comprises a media NF type node.

3. The method of Embodiment 2, wherein the media NF type node is one of an access media gateway, A-MGW, an Internet Protocol, IP, multi-media gateway, IM-MGW, and a media resource function, MRF.

4. The method of any one of Embodiments 1-3, wherein the requesting first NF node (14) is an Internet Protocol, IP, multimedia subsystem, IMS, node (14).

5. The method of Embodiment 4, wherein the IMS node (14) is one of a proxy call session control function, P-CSCF, node (14), a media gateway control function, MGCF, node (14) and an IMS application server, IMS-AS, node (14).

6. The method of any one of Embodiments 1-5, wherein the discovery request indicating the at least one media-related information is received as a result of a message that indicates a request for a media type communication for the UE and wherein the discovered at least one second NF node (14) is selected to serve the media type communication for the UE.

7. The method of any one of Embodiments 1-6, wherein the at least one media-related information associated with the UE comprises a location information for the UE, a media type requested by the UE and at least one codec supported by the UE.

8. The method of Embodiment 7, wherein the location information for the UE comprises a cell identifier associated with UE and network provided location information, NPLI, for the UE.

9. The method of any one of Embodiments 1-8, wherein the at least one media-related information associated with the UE at least one of:
- is based on information in a session initiation protocol, SIP, message from the UE;
- is based on information in a SIP INVITE message;
- is based on information in a P-Access-Network-Info, PANI, SIP header; and/or
- comprises a target media NF type node that the at least one second NF node (14) is requesting to be discovered to serve the UE.

10. The method of any one of Embodiments 1-9, wherein discovering the at least one second NF node (14) further comprises discovering the at least one second NF node (14) having profile information corresponding to the media-related information associated with the UE.

11. The method of Embodiment 10, wherein discovering the at least one second NF node (14) having profile information corresponding to the media-related information comprises at least one of:
- discovering the at least one second NF node (14) having profile information indicating support for at least one codec supported by the UE;
- discovering the at least one second NF node (14) having profile information indicating a location proximity to the UE; and/or
- discovering the at least one second NF node (14) having profile information indicating a media NF type node that is requested by the first NF node (14) for the UE.

12. The method of any one of Embodiments 1-11, wherein the network node (12) comprises a network repository function, NRF, node (12).

13. The method of any one of Embodiments 1-12, wherein the network node (12) is provisioned with profile information for at least one NF node (14) in the at least one second NF node (14).

14. The method of any one of Embodiments 1-12, wherein at least one NF node (14) in the at least one second NF node (14) requests to register profile information to the network node (12).

15. The method of any one of Embodiments 1-14, further comprising:
receiving a subscription request to be notified about one of an addition of a new media NF type node (14) and a profile information update of an existing media NF type node (14); and
sending a notification upon detection of the one of the addition and the profile information update.

16. A method in a network node (14) comprising a first network function, NF, the method comprising:
sending (S106) a discovery request, the discovery request indicating at least one media-related information associated with a user equipment, UE; and
receiving (S108) a discovery response to the discovery request, the discovery response indicating at least one second NF node (14), the at least one second NF node (14) being discovered based at least in part on the media-related information.

17. The method of Embodiment 16, wherein the discovered at least one second NF node (14) comprises a media NF type node (14).

18. The method of Embodiment 17, wherein the media NF type node (14) is one of an access media gateway, A-MGW, an Internet Protocol, IP, multi-media gateway, IM-MGW, and a media resource function, MRF.

19. The method of any one of Embodiments 15-18, wherein the network node (14) is an Internet Protocol, IP, multimedia subsystem, IMS, node (14).

20. The method of Embodiment 19, wherein the IMS node (14) is one of a proxy call session control function, P-CSCF, node (14), a media gateway control function, MGCF, node (14) and an IMS application server, IMS-AS, node (14).

21. The method of any one of Embodiments 15-20, wherein the discovery request indicating the at least one media-related information is sent as a result of a message that indicates a request for a media type communication for the UE and wherein the discovered at least one second NF node (14) is selected to serve the media type communication for the UE.

22. The method of any one of Embodiments 15-21, wherein the at least one media-related information associated with the UE comprises a location information for the UE, a media type requested by the UE and at least one codec supported by the UE.

23. The method of Embodiment 22, wherein the location information for the UE comprises a cell identifier associated with UE and network provided location information, NPLI, for the UE.

24. The method of any one of Embodiments 15-23, wherein the at least one media-related information associated with the UE at least one of:
- is based on information in a session initiation protocol, SIP, message from the UE;
- is based on information in a SIP message is a SIP INVITE message;

is based on information in a P-Access-Network-Info, PANI, SIP header; and/or comprises a target media NF type node (14) that the network node (14) is requesting to be discovered to serve the UE.

25. The method of any one of Embodiments 15-24, wherein the at least one second NF node (14) is discovered based at least in part on the at least one second NF node (14) having profile information corresponding to the media-related information associated with the UE.

26. The method of any one of Embodiments 15-25, wherein the at least one second NF node (14) is discovered based at least in part on at least one of:
the at least one second NF node (14) having profile information indicating support for at least one codec supported by the UE;
the at least one second NF node (14) having profile information indicating a location proximity to the UE; and
the at least one second NF node (14) having profile information indicating a media NF type node (14) that is requested by the network node (14) for the UE.

27. The method of any one of Embodiments 15-26, wherein the discovery request is sent to a network repository function, NRF, node (12).

28. The method of Embodiment 27, wherein profile information for at least one NF node (14) in the at least one second NF node (14) is provisioned to the NRF node (12).

29. The method of any one of Embodiments 15-28, wherein profile information for at least one NF node (14) in the at least one second NF node (14) is registered to the NRF node (12).

30. The method of any one of Embodiments 15-29, further comprising:
sending a subscription request to be notified about one of an addition of a new media NF type node (14) and a profile information update of an existing media NF type node (14); and
receiving a notification upon detection of the one of the addition and the profile information update.

31. A network node (12), comprising processing circuitry (32) configured to perform any one or more of the methods of Embodiments 1-15.

32. A network node (14), comprising processing circuitry (42) configured to perform any one or more of the methods of Embodiments 16-30.

33. An apparatus (12) having a non-transitory computer readable medium (34) comprising computer program instructions executable by at least one processor (36) to cause the apparatus (12) to perform any one or more of the methods of Embodiments 1-15.

34. An apparatus (14) having a non-transitory computer readable medium (44) comprising computer program instructions executable by at least one processor (46) to cause the apparatus (14) to perform any one or more of the methods of Embodiments 16-30.

One or more of the following abbreviations may be used herein:

| Abbreviation | Explanation |
| --- | --- |
| 5GC | Fifth Generation Core |
| AF | Application Function |
| AMF | Access and Mobility Function |
| A-MGW | Access Media Gateway |
| AS | Application Server |

-continued

| Abbreviation | Explanation |
| --- | --- |
| IM-MGW | IP Multimedia Media Gateway |
| IMS | IP Multimedia Subsystem |
| IMS AS | IP Multimedia Subsystem Application Server |
| MGCF | Media Gateway Control Function |
| MGW | Media Gateway |
| MRFC | Media Resource Function Controller |
| MRFP | Media Resource Function Processor |
| NF | Network Function |
| NRF | Network Repository Function |
| RTP | Real Time Protocol |
| P-CSCF | Proxy Call Session Control Function |
| SBI | Service Based Interface |
| S-CSCF | Serving Call Session Control Function |
| SIP | Session Initiation Protocol |
| UE | User Equipment |

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A method in a network node, the method comprising:
receiving a discovery request from a first network function, NF, node to discover at least one media NF type node, the discovery request indicating:
a media NF type of the at least one media NF type node, the media NF type being one of an access media gateway, A-MGW, an Internet Protocol, IP, multimedia gateway, IM-MGW, and a media resource function, MRF;
at least one of one or more supported codecs and transcoding support information by the media NF type; and
location information for a user equipment, UE, the location information for the UE including a cell identifier associated with the UE and network provided location information, NPLI, for the UE;
in response to the discovery request, discovering the at least one media NF type node based on the at least one of the one or more supported codecs and transcoding support information by the media NF type; and
transmitting a discovery response to the discovery request, the discovery response indicating the discovered at least one media NF type node and at least one corresponding NF profile, the at least one corresponding NF profile comprising at least one of one or more media types, the one or more supported codecs, and the transcoding support information.

2. The method of claim 1, the first NF node is an Internet Protocol, IP, multimedia subsystem, IMS, node.

3. The method of claim 2, wherein the IMS node is one of a proxy call session control function, P-CSCF, node, a media gateway control function, MGCF, node and an IMS application server, IMS-AS, node.

4. The method of claim 1, wherein the at least one corresponding NF profile further comprises one or more H.248 capabilities.

5. The method of claim 1, wherein at least one of:
the network node comprises a network repository function, NRF, node; and
the network node is provisioned with at least one NF profile corresponding to the at least one media NF type.

6. The method of claim 1, wherein the method further includes:
receiving a subscription request to be notified about one of an added media NF type node and an NF profile update of an existing media NF type node; and
transmitting a notification upon detection of the one of the added media NF type node and the NF profile update.

7. A network node, the network node comprising processing circuitry configured to:
cause the network node to receive a discovery request from a first network function, NF, node to discover at least one media NF type node, the discovery request indicating:
a media NF type of the at least one media NF type node, the media NF type being one of an access media gateway, A-MGW, an Internet Protocol, IP, multimedia gateway, IM-MGW, and a media resource function, MRF; and
at least one of one or more supported codecs and transcoding support information by the media NF type; and
location information for a user equipment, UE, the location information for the UE including a cell identifier associated with the UE and network provided location information, NPLI, for the UE;
in response to the discovery request, discover the at least one media NF type node based on the at least one of the one or more supported codecs and transcoding support information by the media NF type; and
cause the network node to transmit a discovery response to the discovery request, the discovery response indicating the discovered at least one media NF type node and at least one corresponding NF profile, the at least one corresponding NF profile comprising at least one of one or more media types, the one or more supported codecs, and the transcoding support information.

8. The network node of claim 7, the first NF node is an Internet Protocol, IP, multimedia subsystem, IMS, node.

9. The network node of claim 8, wherein the IMS node is one of a proxy call session control function, P-CSCF, node, a media gateway control function, MGCF, node and an IMS application server, IMS-AS, node.

10. The network node of claim 7, wherein the at least one corresponding NF profile further comprises one or more H.248 capabilities.

11. The network node of claim 7, wherein at least one of:
the network node comprises a network repository function, NRF, node; and the network node is provisioned with at least one NF profile corresponding to the at least one media NF type node.

12. The network node of claim 7, wherein the processing circuitry is further configured to cause the network node to:
receive a subscription request to be notified about one of an added media NF type node and an NF profile update of an existing media NF type node; and
transmit a notification upon detection of the one of the added media NF type node and the NF profile update.

13. A method in a network node, the network node comprising a first network function, NF, node, the method comprising:
transmitting a discovery request to trigger a discovery of at least one media NF type node, the discovery request indicating:
a media NF type of the at least one media NF type node, the media NF type being one of an access media gateway, A-MGW, an Internet Protocol, IP, multimedia gateway, IM-MGW, and a media resource function, MRF;
at least one of one or more supported codecs and transcoding support information by the media NF type; and
location information for a user equipment, UE, the location information for the UE including a cell identifier associated with the UE and network provided location information, NPLI, for the UE; and
receiving a discovery response to the discovery request, the discovery response indicating a discovered at least one media NF type node and at least one corresponding NF profile, the at least one corresponding NF profile comprising at least one of one or more media types, and the at least one of the one or more supported codecs, and the transcoding support information, the at least one media NF type node being discovered in response to the discovery request and based on the at least one of the one or more supported codecs and the transcoding support information by the media NF type.

14. The method of claim 13, the first NF node is an Internet Protocol, IP, multimedia subsystem, IMS, node.

15. The method of claim 14, wherein the IMS node is one of a proxy call session control function, P-CSCF, node, a media gateway control function, MGCF, node and an IMS application server, IMS-AS, node.

16. The method of claim 13, wherein the discovery request is transmitted as a result of a message that indicates a request for a media type communication for a UE, and the discovered at least one media NF type node is selected to serve the media type communication for the UE.

17. The method of claim 16, wherein the message that indicates the request for the media type communication for the UE is any one of:
a session initiation protocol, SIP, message from the UE;
a SIP invite message; and
the SIP invite message including a P-Access-Network-Info, PANI, SIP header.

18. The method of claim 13, wherein the at least one corresponding NF profile further comprises one or more H.248 capabilities.

19. The method of claim 13, wherein at least one of:
the discovery request is transmitted to another network node comprising a network repository function, NRF, node;
the discovery response is received from the other network node; and
the other network node is provisioned with at least one NF profile corresponding to the at least one media NF type node.

20. The method of claim 19, wherein the method further includes:
transmitting, to the other network node, a subscription request to be notified about one of an added media NF type node and an NF profile update of an existing media NF type node; and
receiving, from the other network node, a notification upon detection of the one of the added media NF type node and the NF profile update.

21. A network node, the network node comprising a first network function, NF, node, and processing circuitry configured to cause the network node to:
transmit a discovery request to trigger a discovery of at least one media NF type node, the discovery request indicating:
a media NF type of the at least one media NF type node, the media NF type being one of an access media gateway, A-MGW, an Internet Protocol, IP, multimedia gateway, IM-MGW, and a media resource function, MRF; and
at least one of one or more supported codecs and transcoding support information by the media NF type; and
location information for a user equipment, UE, the location information for the UE including a cell identifier associated with the UE and network provided location information, NPLI, for the UE; and
receive a discovery response to the discovery request, the discovery response indicating a discovered at least one media NF type node and at least one corresponding NF profile, the at least one corresponding NF profile comprising at least one of one or more media types, and the at least one of the one or more supported codecs, and the transcoding support information, the at least one media NF type node being discovered in response to the discovery request and based on the at least one of the one or more supported codecs and the transcoding support information by the media NF type.

22. The network node of claim 21, the first NF node is an Internet Protocol, IP, multimedia subsystem, IMS, node.

23. The network node of claim 22, wherein the IMS node is one of a proxy call session control function, P-CSCF, node, a media gateway control function, MGCF, node and an IMS application server, IMS-AS, node.

24. The network node of claim 21, wherein the discovery request is transmitted as a result of a message that indicates a request for a media type communication for a UE, and the discovered at least one media NF type node is selected to serve the media type communication for the UE.

25. The network node of claim 24, wherein the message that indicates the request for the media type communication for the UE is any one of:
a session initiation protocol, SIP, message from the UE;
a SIP invite message; and
the SIP invite message including a P-Access-Network-Info, PANI, SIP header.

26. The network node of claim 21, wherein the at least one corresponding NF profile further comprises one or more H.248 capabilities.

27. The network node of claim 21, wherein at least one of:
the discovery request is transmitted to another network node comprising a network repository function, NRF, node;

the discovery response is received from the other network node; and the other network node is provisioned with at least one NF profile corresponding to the at least one media NF type node.

28. The network node of claim 27, wherein the processing circuitry is further configured to cause the network node to:

transmit, to the other network node, a subscription request to be notified about one of an added media NF type node and an NF profile update of an existing media NF type node; and receive, from the other network node, a notification upon detection of the one of the added media NF type node and the NF profile update.

* * * * *